United States Patent [19]

Engstrom et al.

[11] Patent Number: 5,801,717
[45] Date of Patent: Sep. 1, 1998

[54] METHOD AND SYSTEM IN DISPLAY DEVICE INTERFACE FOR MANAGING SURFACE MEMORY

[75] Inventors: G. Eric Engstrom; Craig G. Eisler, both of Kirkland, Wash.

[73] Assignee: Microsoft Corporation, Redmond, Wash.

[21] Appl. No.: 641,015

[22] Filed: Apr. 25, 1996

[51] Int. Cl.$^6$ .................................................. G06F 13/00
[52] U.S. Cl. .......................... 345/508; 345/501; 345/422
[58] Field of Search ....................................... 395/122, 131, 395/133, 135, 501, 502, 507–509, 520, 515, 521, 511, 332–334, 339–345; 345/133, 185, 187, 200, 201, 189

[56] References Cited

U.S. PATENT DOCUMENTS

| | | | |
|---|---|---|---|
| 5,394,523 | 2/1995 | Harris | 395/131 |
| 5,428,722 | 6/1995 | Marsh et al. | 395/133 |
| 5,455,599 | 10/1995 | Cabral et al. | 345/133 |
| 5,515,494 | 5/1996 | Lentz | 395/344 |
| 5,519,825 | 5/1996 | Naughton et al. | 395/950 |

OTHER PUBLICATIONS

*Implementing Games for Windows Using the WinG API and the WaveMix DLL*, James Finnegan, Microsoft Systems Journal, pp. 61–81, Jan., 1995.

Computer Graphics '88, Proceedings of the conference held in London, Oct. 1988, "one frame ahead: frame buffer management for animation and real-time graphics" K. Auel.

*Primary Examiner*—Kee M. Tung
*Attorney, Agent, or Firm*—Klarquist Sparkman Campbell Leigh and Whinston LLP

[57] ABSTRACT

A display device interface creates surface structures to represent regions in system or video memory. These surface structures enable application programs to access video memory directly. A flipping structure includes a front buffer and one or more back buffers. In response to an application's request to flip a flipping structure, a flipping function changes the reference to underlying surface memory, but the flipping structure remains unchanged with respect to the application. Surface structures are implemented using surface objects that represent pixmaps, Z buffers, or alpha buffers stored in video or system memory. Complex surface structures including two or more surfaces are implemented by attaching surface objects to each other.

17 Claims, 10 Drawing Sheets

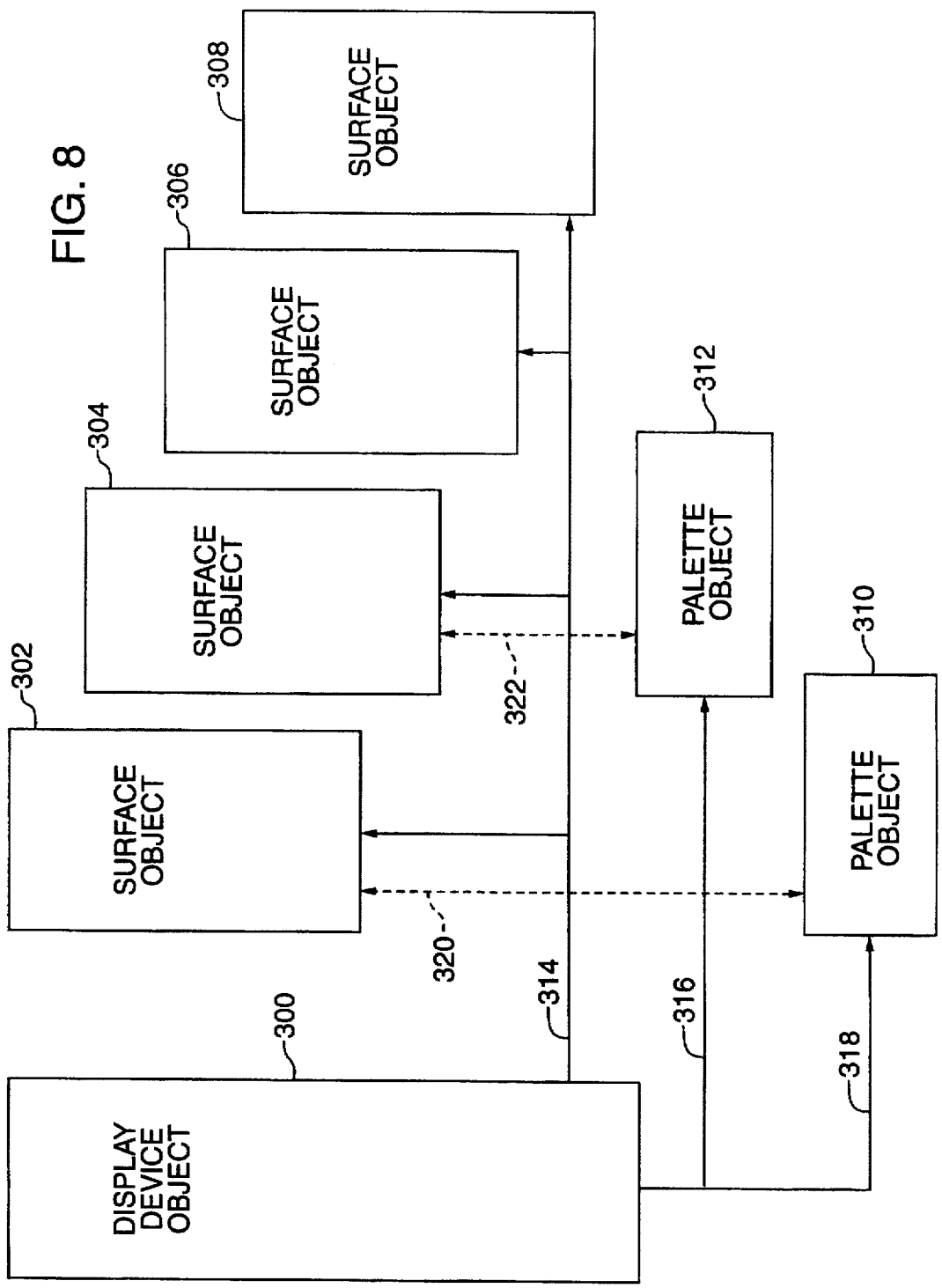

HEAP 1: RECTANGULAR TO RECLAIM EXTRA MEMORY INTERLEAVED WITH THE PRIMARY SURFACE

METHOD AND SYSTEM IN DISPLAY DEVICE INTERFACE FOR MANAGING SURFACE MEMORY

This application is related to the following co-pending U.S. patent applications, which are commonly assigned:

Resource Management For Multimedia Devices In A Computer by Craig G. Eisler and G. Eric Engstrom, filed on Apr. 25, 1996 as Application Ser. No. 08/396,522;

Method And System For Flipping Images In A Window Using Overlays by G. Eric Engstrom and Craig G. Eisler, filed on Apr. 25, 1996 as Application Ser. No. 08/639,333;

Multimedia Device Interface For Retrieving And Exploiting Software And Hardware Capabilities by G. Eric Engstrom and Craig G. Eisler, filed on Apr. 25, 1996 as Application Ser. No. 08/641,017;

Display Device Interface Including Support For Generalized Flipping Of Surfaces by Craig G. Eisler and G. Eric Engstrom, filed on Apr. 25, 1996 as Application Ser. No. 08/641,014;

Method And System For Managing Color Specification Using Attachable Palettes And Palettes That Refer To Other Palettes by Craig G. Eisler and G. Eric Engstrom, filed on Apr. 25, 1996 as Application Ser. No. 08/641,016; and System For Enhancing Device Drivers by Craig G. Eisler and G. Eric Engstrom, filed on Apr. 25, 1996 as Application Ser. No. 08/637,530.

These applications are hereby incorporated by reference.

TECHNICAL FIELD

The invention relates to software interfaces for display devices in computer systems and more specifically relates to methods for managing pixel memory through a display device interface.

BACKGROUND OF THE INVENTION

When creating an application program for a computer such as a PC, the design of the user interface is a major concern to the application developer. In developing the user interface, the programmer typically has to include code to capture input from the user and provide output using the computer's peripherals. The interaction between an application and peripheral devices can vary significantly depending on the type of application and sophistication of the user interface. In a spreadsheet program, for example, the application needs to be informed when the user has updated a cell in a spreadsheet so that it can update the spreadsheet and display the proper result. Since the display changes rather infrequently and does not contain complex graphics in this example, the performance of the underlying software and hardware that controls the user interface is less critical. As such, the programmer can rely on a high level interface to graphics and input devices without being particularly concerned with the performance of the interface. The user interfaces of many of today's multimedia applications, however, are significantly more complex and have rigorous performance requirements. In multimedia games for example, the interaction between the application and peripherals is critical to achieving a highly interactive and realistic user interface. The interaction between the application can include not only reading input from a joystick and displaying images, but can also include mixing audio files to generate sound effects, rendering three dimensional animation using a graphics accelerator, decompressing and playing video, and updating the display image fast enough to depict realistic scenes.

To control a peripheral devices in this manner, the application program can attempt to control the peripheral devices directly or can perform operations through a software interface. A software interface provides access to certain services through a specified set of operations which can be invoked to request the services.

For instance, an interface to sound effect services might include operations to "prepare a sound for playing," "start playing a sound," and "wait until a sound has finished playing." In response to a request for a particular service, the interface attempts to provide the service by taking steps to control the underlying hardware. In effect, the interface does what the application would have to do if it were to try to control the hardware directly. In addition to communicating with the hardware, an interface sometimes provides some resource contention so that programs running in the computer can share access to the limited hardware resources.

For the vast majority of applications, application programmers rely on some form of software interface to interact with the computer's peripherals. Programmers typically rely on software interfaces to the peripherals so that they can focus on the specifics of their application rather than on the specifics of controlling a particular device. Unfortunately, many of today's software interfaces cannot provide the level of performance that multimedia applications demand.

There are a number of software products on the market today that provide interfaces between application programs and peripheral devices. These interfaces are sometimes characterized as low or high level interfaces, and device independent or dependent. A high level interface is one whose operations request big-picture strategic services, such as "start playing this sound" or "display this document." A low level interface is one whose operations request tactical services specifically, such as "tell the sound card at I/O (input/output) address 220 to point its DMA buffer to memory address 1000000" or "tell the video card to copy the 64×64 pixel region from a location starting at address 0000001 to a location starting at 1000000 in video memory." In general a high level interface may be easier for a programmer to use, but a low level interface may provide better performance and functionality. Ease of use comes from having fewer details to take care of, while better performance comes from taking advantage of special cases the hardware handles well. Hiding details tends to disguise special cases as well.

The terms "device independent" and "device dependent" refer to the extent to which the interface is specific to a particular piece of hardware. Device independent interfaces provide operations that are not specific to a particular brand of hardware device. Instead, the operations hide the detail of the hardware from the application and take care of these details internally. In contrast, device dependent interfaces provide operations to control specific features of a particular piece of hardware. To write an application using a device dependent interface, the application developer has to have a detailed understanding of how the specific hardware operates.

Hardware dependence is usually not favored because it is not flexible to changes in the underlying hardware and can often lead to resource contention problems. Programs written for a device dependent interface can be rendered obsolete by updates to the underlying hardware, and commonly do not work for more than one brand of peripheral. In addition, device dependent interfaces are more susceptible to resource contention problems because an application has access to its state information and can render it inoperable for other applications.

In general, high level interfaces tend to be device independent because they hide details, whereas low level interfaces tend to be device dependent because they reveal details. For instance, "play a sound" does not rely on the details of any sound card, but "tell the sound card at I/O address 220 . . ." obviously does.

While device independent, high level interfaces are generally easier to use for the reasons explained above, they typically are unable to provide the performance and functionality needed for certain types of applications. High level interfaces are often not sufficient for game applications and other multimedia applications because they are often incapable of achieving the desired performance. Games demand higher performance because they must achieve a high degree of user interactivity and visual realism. A game application typically has to collect rapidly changing user input, compute its impact on the current scene, and display the corresponding images and playback sounds with imperceptible delay.

Because they are designed for specific tasks, peripherals are usually much better at performing certain types of functions than the host processor. For example, a video card may have special purpose hardware that can copy pixels much faster than the CPU. A high level interface may not take advantage of this particular feature or may include additional layers of code that consume valuable CPU cycles and time before the operation is even started on the peripheral.

Since many peripherals have their own computing resources, such as processors and memory, performance can be improved by off-loading some tasks to the peripheral rather than consuming the resources of the host CPU. However, without a low level interface to expose these resources to the application, they are not fully exploited.

One particular operation that is especially important in multimedia applications is the process of drawing images for display. To achieve better performance, it is often necessary to manipulate a video card directly. Video cards typically provide a writable address register that stores a pointer to an area in the video card's memory holding a screen-sized display image. In order for an application to control this register directly, the application must have specific information about the card and must keep track of the specific address location of the display image stored in the video card. In addition, the application must keep track of timing information of the display monitor so that it can properly instruct the video card to display an image at a specified location.

These hardware related details make it difficult for applications to control double buffering. The term, double buffering, refers to a technique for generating a display image. In this well known technique, two different physical memory buffers or two different regions in video memory are used to generate an image. While the first image is being rendered to the back buffer, the display hardware scans out a complete image from the front buffer. To update the display with a new image, the display hardware then performs a buffer swap. The display image that was just under construction is then used as the source for the display screen, and a new image is constructed in the buffer that held the previous display image. Double buffering is necessary to prevent the display hardware from displaying the pixels in a region in video memory before the application has finished drawing all of the pixels composing that display image in that region of video memory.

Because of all the details that the application needs to track to control the video card, the process of generating a display image is complex and limited. It is complex because the application must maintain all of the hardware specific details about the current and next display image. It is limited because the application often cannot take advantage of all of the hardware capabilities. For example, applications are typically limited to double buffering between two whole display images. Such applications cannot support multiple buffering, or buffering among images other than complete display images, without a significant amount of effort.

Some software interfaces are available that provide high level functions to simplify the display generation process. However, these interfaces suffer from the drawback that the application cannot directly access video card resources such as video memory and graphics accelerator hardware. For example, some interfaces manipulate image data in system memory first, and then copy the image or portions of it to the video memory before the display is generated. The intermediate step of transferring an image from system memory to video memory can significantly degrade performance.

SUMMARY OF THE INVENTION

The invention provides a display device interface and associated methods for managing surface memory. Surface memory refers generally to a region in system or video memory that holds a "surface." A surface includes a pixmap image, or other two-dimensional image data such as an array of depth values (z), or an array of transparency values (alpha). One aspect of the invention is a method for managing surface memory using surface structures. By invoking a function in the display device interface, applications can create a surface structure that represents one or more surfaces. A flipping surface structure represents a front buffer, and one or more back buffers.

The display interface controls double and multiple buffering by performing a flip operation on a flipping structure. In response to a request to "flip" a flipping structure, the flip operation swaps the underlying surface memory, but the flipping structure remains constant from the perspective of the application. As a result, the application can always write to the same surface in the surface structure, such as the back buffer for example, without having to keep track of the addresses of the underlying surface memory.

The display interface enables applications to create off screen surfaces as well as complex surface structures including two or more surfaces. Examples of complex structures include a surface structure with a front and back buffer, and a surface structure with a front buffer and two or more back buffers. Alpha or Z buffers can be attached to an off screen surface and to back buffers, for example.

Surface structures can be implemented using surface objects. In an object architecture, the display device interface is represented by a display device object. The display device object owns the display device and includes member functions to create other objects, including the surface object. To create complex structures or flipping structures, an application invokes a create surface member function of the display object and specifies the type of surface or surfaces that it wants to create. In response, the display interface creates an instance of a surface object, or multiple instances of the display object. Complex surface structures are formed by attaching instances of the surface object together.

Further features and advantages will become apparent with reference to the following detailed description and accompanying drawing.

BRIEF DESCRIPTION OF THE DRAWINGS

FIG. 8 is a block diagram illustrating the object architecture of one embodiment of a display device interface.

DETAILED DESCRIPTION

Figure 1:
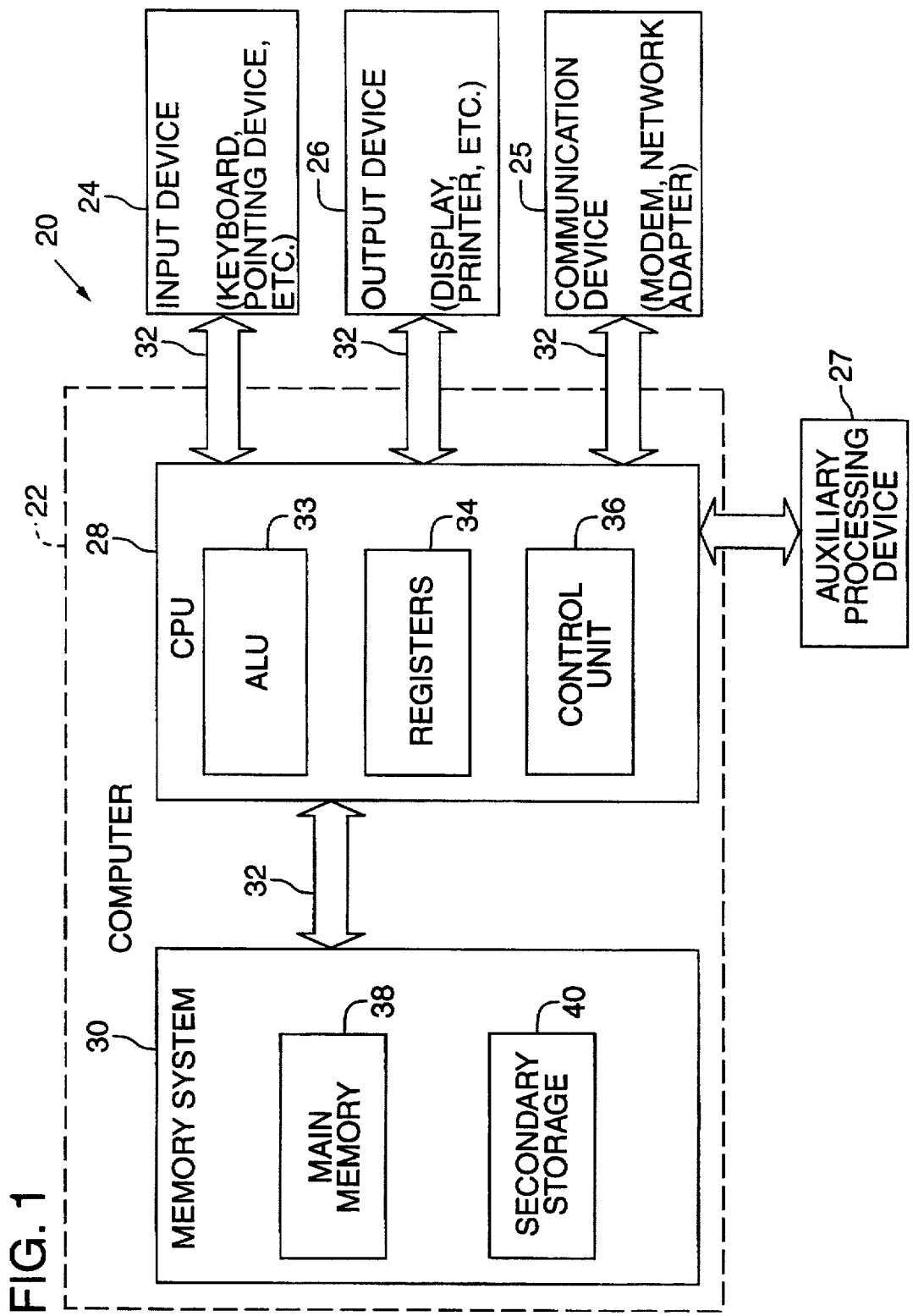
FIG. 1 is a general block diagram of a computer system 20 in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some implementations, main memory 38 may also include video display memory for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter (25).

The auxiliary processing device 27 refers generally to a peripheral with a processor for enhancing the performance of the computer. One example of an auxiliary processing device is a graphics accelerator card.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

Figure 2:
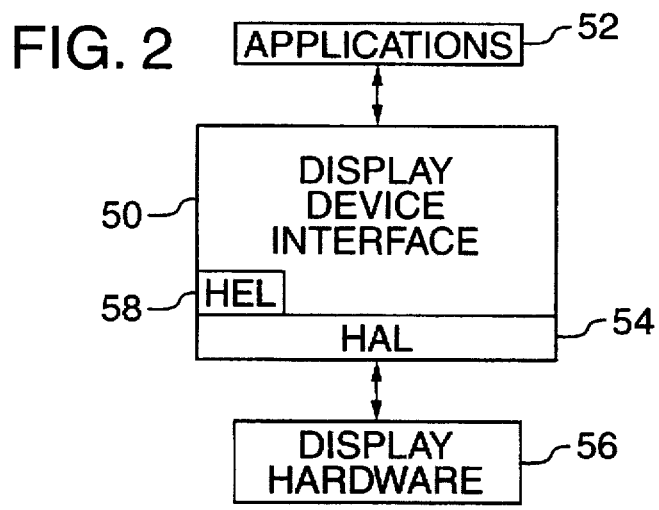
FIG. 2 is a block diagram illustrating the architecture of a device interface in which one embodiment of the invention is implemented.

FIG. 2 is a block diagram illustrating the architecture of a display device interface 50 in which an embodiment of the invention is implemented. This diagram illustrates relationships between application programs ("applications") 52, the display device interface 50, the hardware abstraction layer 54, and the display hardware 56. Applications 52 access the display hardware 56 through the display device interface 50, which serves as a device independent interface to the display hardware 56. The display device interface 50 performs parameter validation, memory management of the video memory, and bookkeeping for the interface. We describe specific features of the interface in further detail below.

The HAL (hardware abstraction layer) 54 is a hardware dependent interface to the display hardware 56. In this embodiment, the HAL includes only hardware specific code. It can be an integral part of the display hardware 56, or in the alternative, can be implemented in software on the host computer (22 in FIG. 1, for example). In the latter case, the HAL is typically implemented as a dynamic linked library (DLL). The HAL can be implemented by anyone who understand the functionality of the display hardware. It is usually implemented by and available from the manufacturer of the display card or chip.

The display device 50 interface can optionally include a hardware emulation layer (HEL) 58 to emulate display hardware features if they are not available in the display hardware.

The display hardware 56 includes the hardware devices within and/or coupled to the host computer that are responsible for displaying visual data including 2D and 3D rendered graphics and animation, video, text and still images.

Figure 3A:
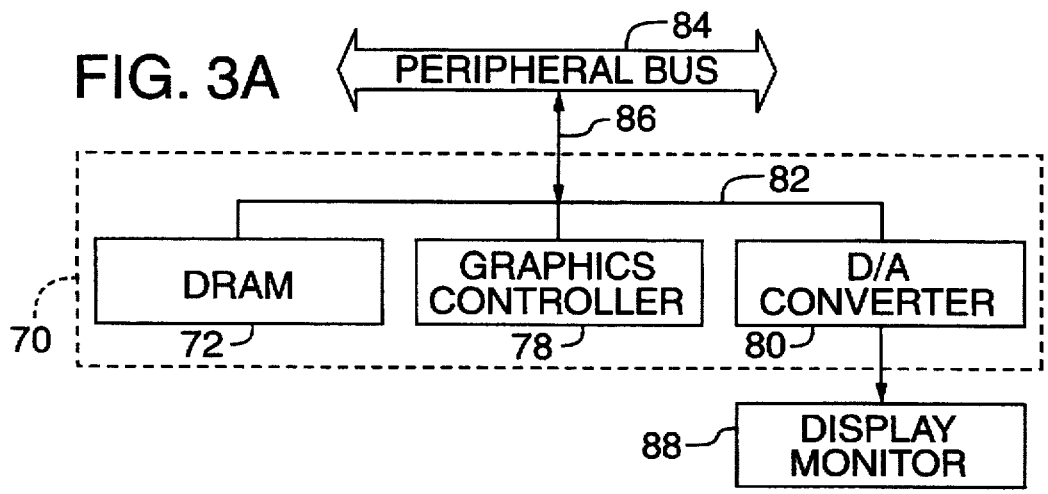
FIGS. 3A, 3B, 3C, and 3D are block diagrams showing four examples of display device architectures.
Figure 3B:
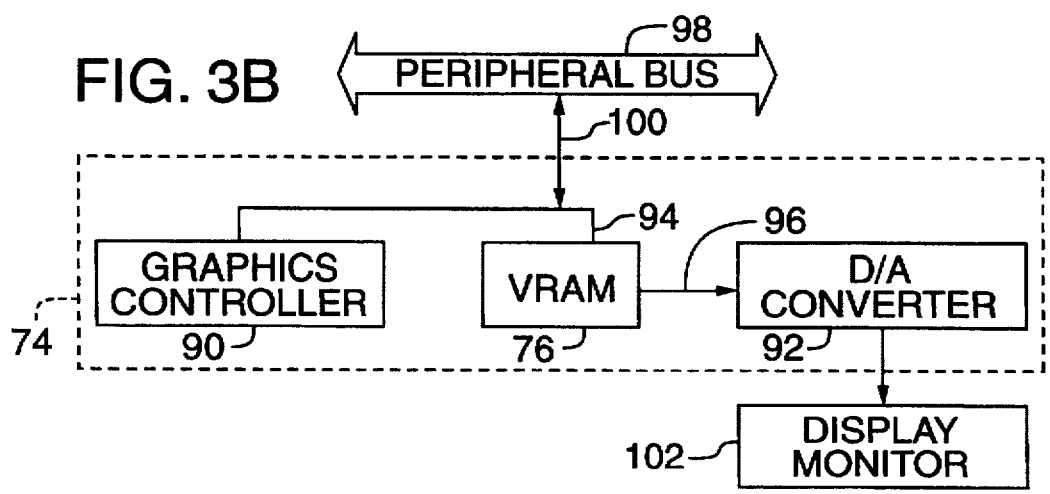
Figure 3C:
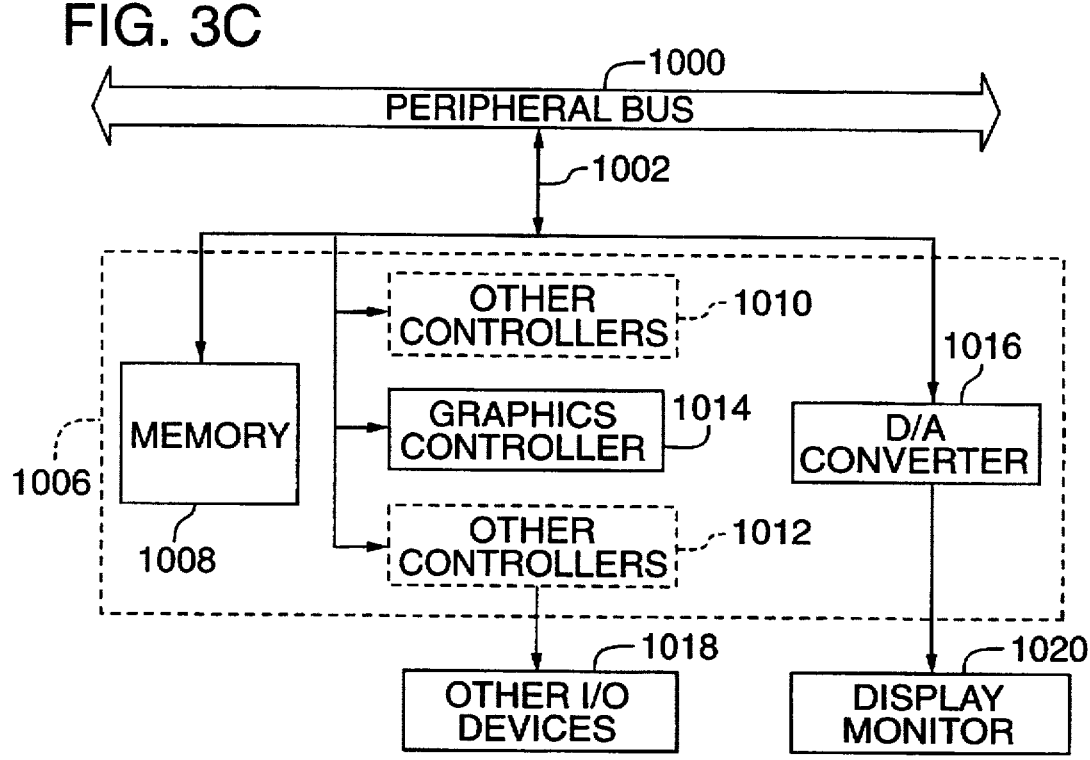
Figure 3D:
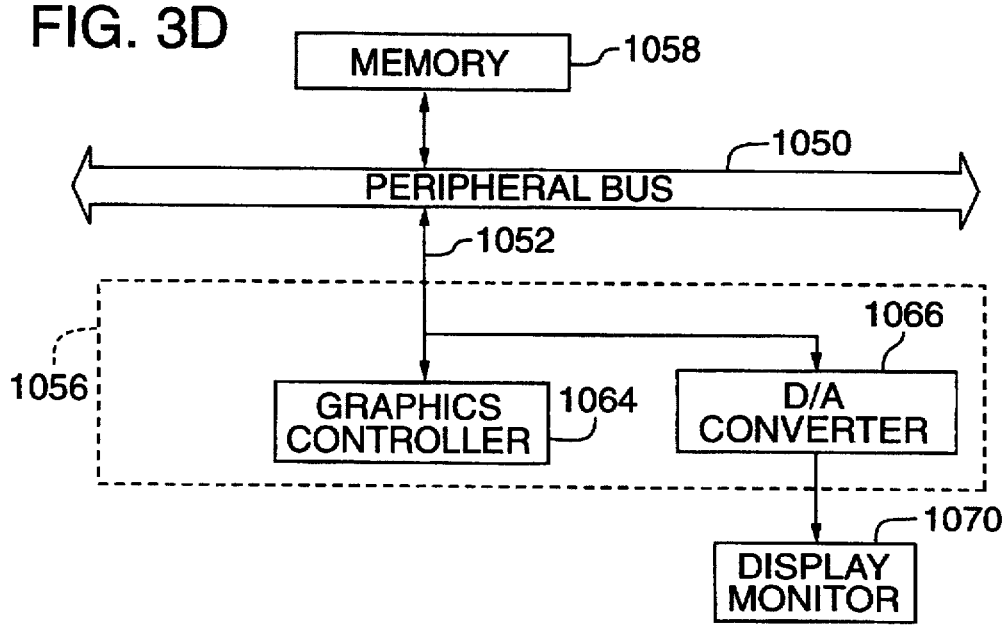

FIGS. 3A, 3B, 3C, and 3D are block diagrams showing four examples of display device architectures. FIG. 3A illustrates the architecture of a video card 70 which includes video memory implemented with DRAM (dynamic random access memory) 72. FIG. 3B illustrates the architecture of a display card 74 which includes video memory implemented with VRAM (video random access memory) 76. The video cards shown in FIGS. 3A and 3B represent only two examples of video cards with significant on board memory in common use today. For example, there are numerous types of RAM (random access memory) used on video cards. VRAM and DRAM are just two common examples. The display device interface 50, shown generally in FIG. 2, is designed to be compatible with a wide variety of display controllers whether implemented in a video card, in a video chip in the computer, or some other configuration. FIG. 3C illustrates the architecture of a multimedia card where the memory used by the display card is shared with other accelerators. FIG. 3D illustrates the architecture of a display card where the memory used by the display card is shared with the host processor. The display device interface is intended to work across any of these architectures, combinations of them, or other architectures for storing and composing pixmaps onto a display device.

The video card in FIG. 3A includes as its basic elements a graphics controller 78, video memory 72 implemented with DRAM, and a digital-to-analog converter 80. In this type of video card, each of these elements share a common bus 82. On one side, the video card is connected to a bus 84 on the host computer via a bus interface 86. On the other side, the video card is connected to a physical display device such as a display monitor 88. To generate the video display, the video card 70 receives image data and display commands from the host computer (22, for example) and controls the transfer of image data to a display monitor 88. The graphics controller 78 is responsible for acceleration and other graphics operations. When the digital-to-analog converter 80 needs to take the digitally represented image data from the DRAM and send it to the monitor, the graphics controller 78 is placed on hold until the DAC 80 finishes its task.

The video card 74 in FIG. 3B includes a graphics controller 90, video memory 76 implemented with VRAM, and a DAC 92. One significant difference between the design of this card and the card in FIG. 3B is that the graphics controller 90 and DAC 92 access the VRAM 76 through separate ports (94, 96). Coupled to a peripheral bus 98 of the host computer via a bus interface 100, the video card 74 receives image data and commands from its host and controls the display of image data stored in the video memory 76. Since the VRAM is dual ported, the DAC 92 can transfer image data to the monitor 102 as the graphics controller 90 performs operations on other image data in the video memory.

The video card 1006 in FIG. 3C includes a graphics controller 1014, "video" memory 1008 (which is not specific to any particular technology used to implement the memory), and a DAC 1016. One significant difference between the design of this card and the card in FIG. 3B is that the graphics controller 1014 shares the "video" memory with other controllers 1010/1012 and the DAC 1016. There are many memory architectures for these types of cards and the device display interface supports all of them. Coupled to a peripheral bus 1000 of the host computer via a bus interface 1002, the video card 1006 receives image data and commands from its host and controls the display of image data stored in the "video" memory 1008. Arbitration between other controllers can be handled either in the HAL or by the hardware.

The video card 1056 in FIG. 3D includes a graphics controller 1064, "video" memory 1058 (which is not specific to any particular technology used to implement the memory), and a DAC 1066. One significant difference between the design of this card and the card in FIG. 3B is that the graphics controller 1064 shares the "video" memory with the host processor and the DAC 1066. There are many memory architectures for these types of cards and the device display interface supports all of them. Coupled to a peripheral bus 1050 of the host computer via a bus interface 1052, the video card 1056 receives image data and commands from its host and controls the display of the image data on the display monitor 1070. Arbitration between other peripherals on the bus can be handled either in the HAL, by the video card 1056, by the operating system, or the bus.

The display device interface 50 shown in FIG. 2 acts as an interface to display hardware such as the video cards (70, 74, 1006, 1056) illustrated in FIGS. 3A, 3B, 3C and 3D. The display device interface 50 enables applications to access video memory (72, 76, 1008, 1058, for example), including both off screen and on screen memory. It also gives the applications access to special purpose graphics hardware (78, 90, 1014, and 1064, for example), where available, to enhance performance. In cases where the underlying graphics hardware does not support a requested service, the interface can potentially emulate the service through the software in the HEL 58.

The display interface 50 provides services to enable applications to manage surface memory. Surface memory refers to the system or video memory used to store "surfaces." In general, surfaces include pixmaps and other image data such as depth (z) and transparency (alpha) values. To support operations on surface memory, the interface creates and manages a data structure called a surface structure, and enables applications to access and manipulate the surface structure through a set of interface functions.

Through these surface structures, the display interface manages low level details about the underlying surface memory while still enabling applications to achieve high performance through direct access to graphics accelerator hardware and video memory. The display interface includes functions to create and modify surface structures. A surface structure can represent a single surface or a number of surfaces linked together. A surface structure that represents more than one surface is referred to as a complex surface. Before describing specific operations involving surface structures, the display interface's heap manager will be discussed along with examples of common memory architectures.

When allocating a surface, the heap manager (not shown) of the display device interface 50 scans through the video memory described to it by the HAL 54 in the order the video memory heap descriptions (see the VIDMEM structure below for an example) are listed in the video memory heap data structure. In one implementation, these heap descriptions are managed in an array (see the array of VIDMEM structures below for an example). The memory that the heap manager allocates first will be the memory that is described by the first VIDMEM structure in the array of VIDMEM structures. The VIDMEM structure contains the starting address of the heap, the amount of memory in the heap, and what cannot be done with the heap. The heap manager manages the heap by sub-allocating and deallocating memory, that is, creating and destroying surfaces under each heap's jurisdiction. The physical limits of the hardware determine how to set up the heaps and their attributes.

The heap manager makes two passes through the array of VIDMEM structures. In one example implementation, the field ddsCaps (in the VIDMEM structure) represents the types of surfaces that cannot be allocated out of the heap during the display device interface's first pass. In the same example implementation, the field ddsCapsAlt (in the VIDMEM structure) represents the types of surfaces that cannot be allocated out of the heap during the heap manager's second pass. While this example differentiates the capabilities for only two passes, that is not a limit of the design; the design is capable of n iterations through the heap to enable whatever degree of control is required for the display device interface.

An example of the use of this multi-pass heap manager is a situation where the back buffer must start on a specific address in order to enable page flipping on cards that were not designed for flipping. In this example, a heap can be created that describes the video memory from the end of the primary surface to the beginning of the video memory region required for the back buffer. Its surface capabilities will be set to DDSCAPS_BACKBUFFER for both the ddsCaps field and the ddsCapsAlt field in the VIDMEM structure. This is done to prevent back buffers from being allocated out of this memory. The next video memory heap created describes the region of video memory required for the back buffer. The first pass surface capabilities of this heap, ddsCaps, is set to DDSCAPS_OFFSCREENPLAIN. This is done to exclude all surfaces, except DDSCAPS_BACKBUFFER surfaces, from this heap on the first pass. The second pass surface capabilities of this heap, ddsCapsAlt, is set to 0 so that the video memory reserved for the back buffer can be used for some other type of surface after all other video memory has been allocated. The final video memory heap in the example describes the remaining video memory available to the display device interface. This is the video memory that starts at the end of the region reserved for the back buffer and ends at the upper bound of the physical memory on the device. This heap would have the same first and second pass surface capabilities as the first heap, e.g., ddsCaps would be set to DDSCAPS_OFFSCREENPLAIN and ddsCapsAlt would be set to DDSCAPS_OFFSCREENPLAIN.

The multi-pass heap manager described above is not limited to video memory or to only two passes. Both of these restrictions are restrictions of the example only. The multi-pass heap manager described here is also not limited to describing regions of memory that are optimal for back buffers. Other uses include special alignment and bandwidth requirements for video memory that will be written to by hardware codecs and controlling access to texture memory heaps which are often on separate buses.

The following example of a VIDMEM structure includes the characteristics described above along with other elements. The dwFlags field in this example is used to determine whether this structure describes a linear or rectangular heap. If the heap is linear then the union member fpEnd is valid. Linear heaps describe regions of memory where the pitch of each surface allocated out of the heap can be different. Rectangular heaps describe regions of memory where the pitch of each surface allocated out of the heap must be the same. If the heap is rectangular then the union members dwWidth and dwHeight are valid. These heaps can be mixed and matched within the same display device interface.

```
typedef struct _VIDMEM
{
    DWORD       dwFlags;    // flags, rectangular or linear
    FLATPTR     fpStart;    // start of memory chunk
    union
    {
        FLATPTR     fpEnd;      // end of memory chunk
        DWORD       dwWidth;    // width of chunk(rectanglar memory)
    };
    DDSCAPS     ddsCaps;    // what this memory CANNOT be used for
    DDSCAPS     ddsCapsAlt; // what this memory CANNOT be used if
                            // no other memory found on first pass
    union
    {
        LPVMEMHEAP  lpHeap;     // heap pointer, used by DDRAW
        DWORD       dwHeight;   // height of chunk(rectangular memory)
    };
} VIDMEM;
struct VIDMEM arrayOfVidmem[2];
```

There are descriptions for three examples of memory configurations in this document, each of which can be used with the present invention. They are not the only possible memory configurations and are not meant to represent a comprehensive list. The three cases were selected so that an example of the most common two kinds of memory could be shown and a single example of the many possible mixtures of these two kinds of memory configurations could be shown. The three examples cover a linear memory configuration, a rectangular memory configuration and a mixed video memory configuration including rectangular and linear memory.

Figure 9:
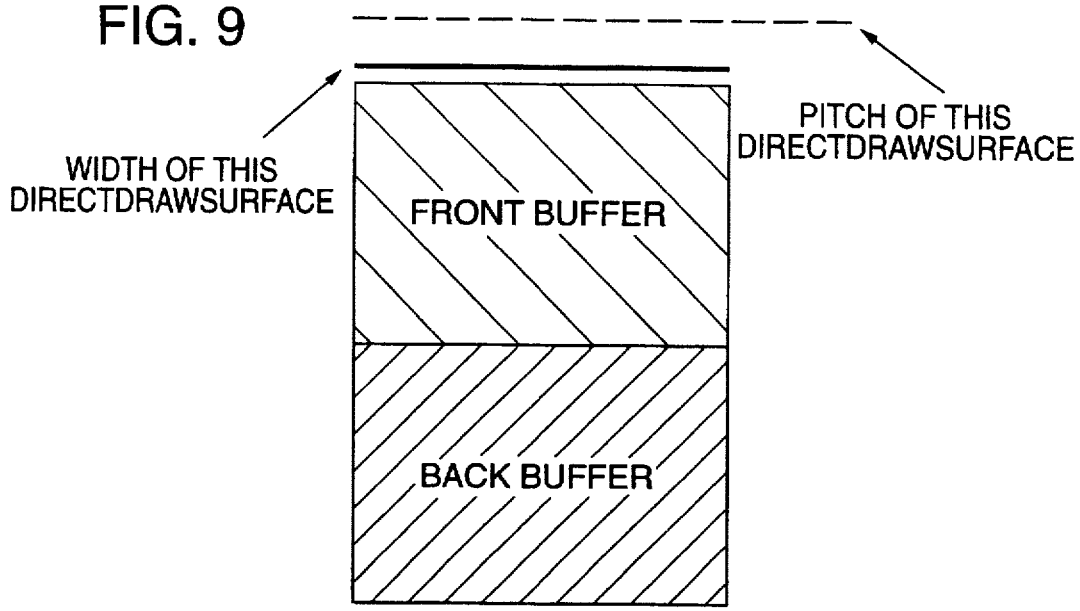
FIG. 9 is a block diagram illustrating the difference between width and pitch.

Before describing the three types of memory configurations, pitch will be described since it is a concept that has application to memory configurations. In FIG. 9, the pitch (or stride) is the number of bytes added to get from one column of display memory to the same column on the row below it. In linear memory it is the same as the width of the front buffer, modulo word alignment restrictions. In rectangular memory, it is the width of the front buffer plus whatever memory is left over to the right of the front buffer. In either case, it is the number of bytes added to the beginning of one row to reach the beginning of the next row below it.

Figure 10:
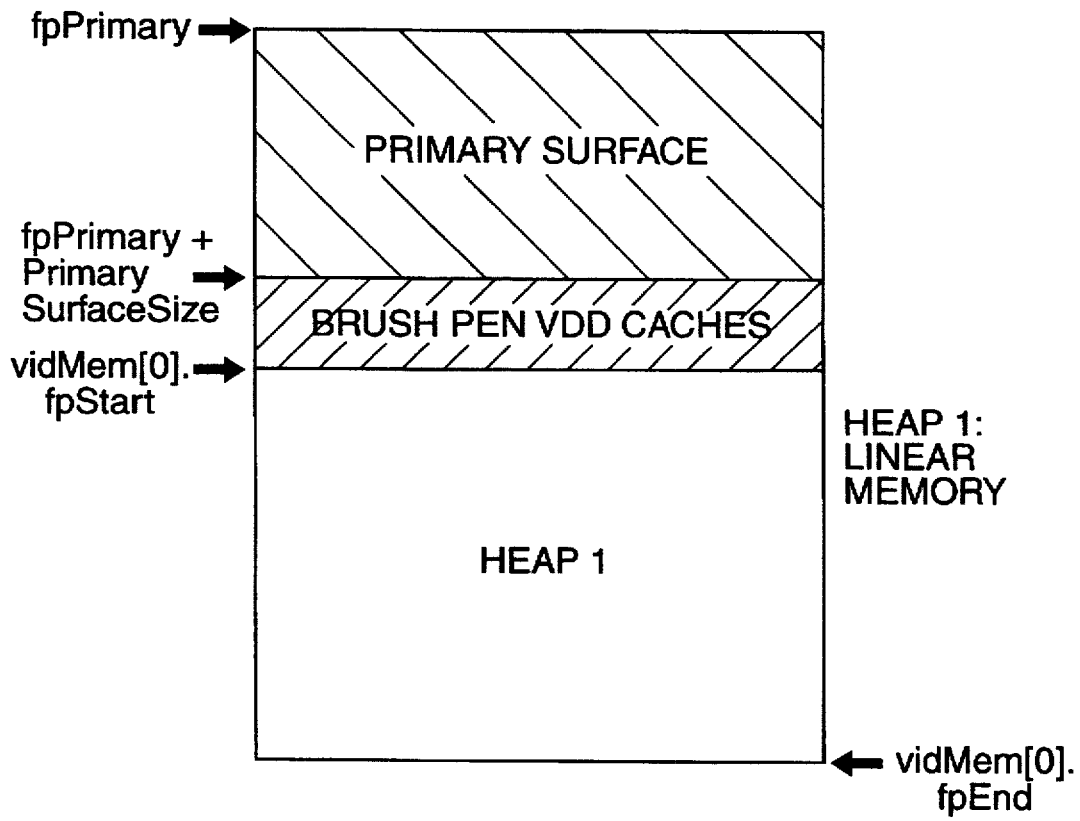
FIG. 10 is a block diagram illustrating one possible layout of memory in a linear memory architecture.

The first memory configuration example, see FIG. 10, is a linear memory configuration. Video memory is considered linear whenever the pitch can be changed to match the surface width, modulo natural alignment restrictions. For example, if the hardware can only operate on 8 byte strides, and a 31 pixel sprite was being used, each line of the display would need to be adjusted by 1 to align the next row of the image on an 8 byte boundary. Linear memory is generally used more efficiently by applications than rectangular memory because the rows are stored sequentially. Any particular location in the heap can be accessed easily by moving forward or backwards along this linear range. The pitch is determined by the pixel depth and surface width including natural alignment restrictions. If the primary surface is 640 8 bit pixels across then the pitch is 640. If the pixels are 16 bit and the primary surface is 640 pixels across then the pitch is 1280. Likewise 640 wide, 32 bit pixel screens have a pitch of 2560 in linear video memory.

An example of a linear memory heap allocation with one primary surface and one scratch area, would use fpPrimary as the pointer to the start of the primary surface. To this, the size of the primary surface and the various operating system caches are added to give a pointer to the beginning of the scratch area (vidMem[0].fpStart of the VIDMEM data structure). The end point (vidMem[0].fpEnd) is calculated by adding the size of the remaining memory.

Figure 11:
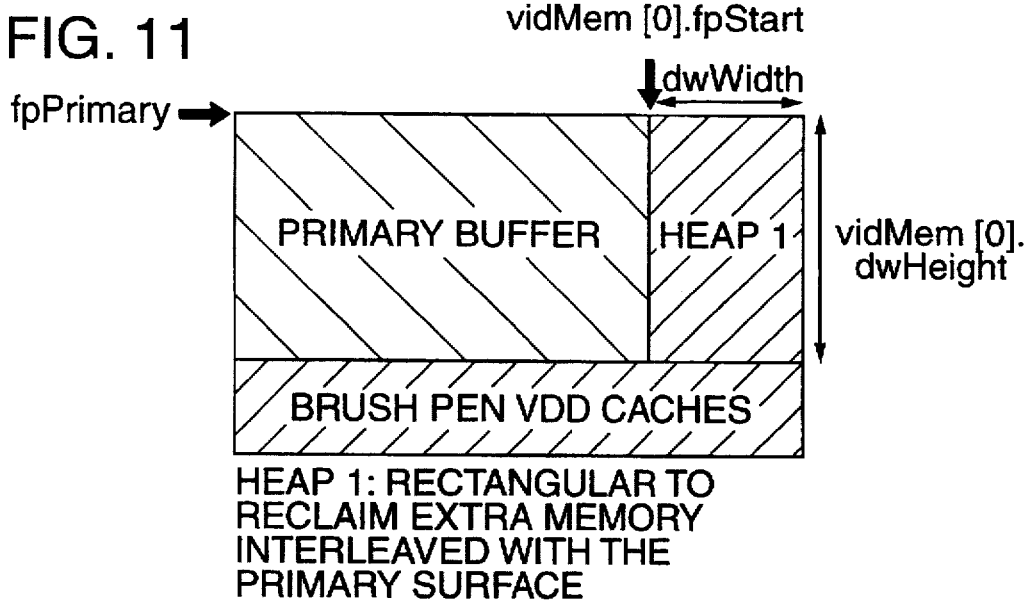
FIG. 11 is a block diagram illustrating one possible layout of memory in a rectangular memory architecture.

The second memory configuration example, see FIG. 11, is for a rectangular memory configuration. Video memory is considered rectangular whenever the pitch is fixed to a particular size for all the surfaces within a given heap. This means that with rectangular video memory, the layout is two dimensional with a finite width and height. This is not always the same as the width of the primary surface. Because video memory must account for different display resolutions and design considerations, the actual horizontal width may span a much larger region than what is currently displayed on the monitor. A rectangular heap can be as large as a contiguous region of available memory, but it can not be "L" shaped since its size is measured in X by Y coordinates. If the rectangular heap is not tall and wide enough to hold a primary surface then it can't be a primary surface back buffer and its surface capabilities should reflect that. If the pitch of the primary surface is not equal to the display width of the primary surface, there will be a rectangular block of memory, conceptually, to the right of the display, which is left over. This block is as wide as the pitch minus the width of the primary surface.

In the rectangular memory example, the starting point (the fpStart field of the VIDMEM structure) of the rectangular heap is calculated by adding the width of the primary surface to the starting address of the primary surface. The width and height are also calculated to give the dimensions of the rectangular heap.

Figure 12:
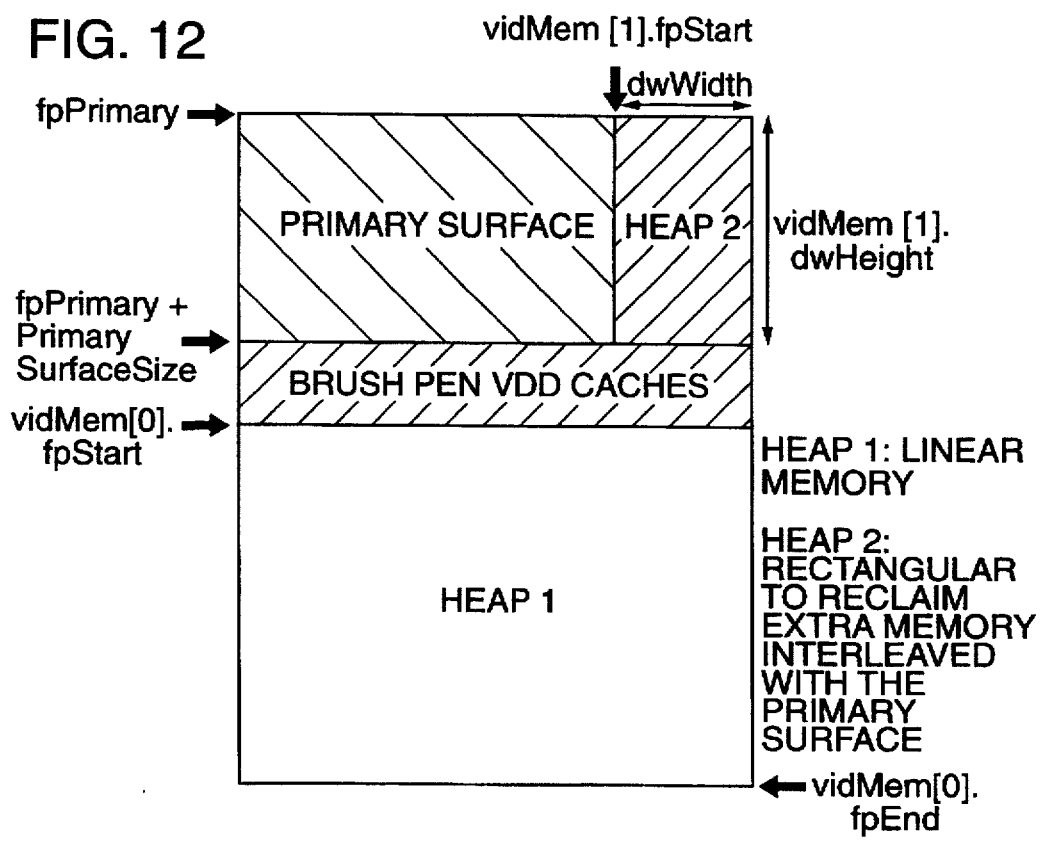
FIG. 12 is a block diagram illustrating one possible layout of memory in a mixed memory architecture which includes rectangular and linear segments.

The third memory configuration example, see FIG. 12, will describe a mixed configuration containing both linear and rectangular memory heaps. This example shows one heap of each but they may be mixed and matched in any fashion. The front buffer has a fixed pitch and the driver has described a rectangular heap to the right of it. There is also memory left over below the primary surface which can be accessed in a linear fashion; this area can be made into a linear heap which can be used for a back buffer if it is large enough. Linear and rectangular heaps can be mixed and matched in any way that conforms to the hardware limitations.

Rectangular memory creates a problem for the clients (applications) of the display device interface. Rectangular memory imposes a fixed width which is much smaller than the total size of free memory and is directly proportional to how many rows of image data a particular heap can store. In linear memory, one image can be allocated in memory right after another. In rectangular memory, the images are interleaved. An application that relies on images that are greater than the fixed pitch of a particular rectangular memory configuration would be unable to take advantage of hardware acceleration on that hardware because the hardware could not support video memory surfaces as wide as the ones the application requested.

One common characteristic of rectangular memory configurations is that they must support rectangular memory that is at least as wide as the primary surface. The display device interface protects its applications from hardware incompatibility by limiting the width of any surface specified as DDSCAPS_VIDEOMEMORY or not specified as DDSCAPS_SYSTEMMEMORY to the width of the primary surface.

To support double and multiple buffering of surfaces, the display interface includes a flipping function that operates on a complex surface structure representing two or more surfaces. In response to a flipping function call, the display interface controls the exchange of the underlying surface memory. From the perspective of the application, the surface structure representing the underlying surface memory stays constant. This simplifies application development significantly because the application does not have to keep track of the specific details of the underlying surface memory. For instance, the application does not have to keep track of the specific surface memory that it is currently drawing to, or that the display hardware is currently displaying.

In allocating memory for a surface, the interface uses either the video memory or system memory to prepare an image for display. In general, the interface attempts to use video memory first, and then uses system memory if the video memory is insufficient. An application can also specify that an image is to reside in system memory or video memory. When we use the term "memory" below, we intend to include either system or video memory.

The video memory available to a graphics controller varies considerably from display adapter product to display adapter product. The capabilities and behaviors of surfaces in video memory differ substantially from those of surfaces in system memory. The display device interface provides the client with three ways to specify the type of memory that should be used for a surface. This specification is made to the CreateSurface call. The three options are specifying DDSCAPS_VIDEOMEMORY, which will fail if there is not enough free video memory to hold the surface; specifying DDSCAPS_SYSTEMMEMORY, which will cause the surface to be allocated in system memory no matter how much video memory is available; and not specifying where the surface should go. In the case where the memory location of the surface (video memory or system memory) is not specified, the display device interface will put the surface into video memory if there is room in video memory. Because there is no way to tell whether this surface will end up in video memory, this surface will always have all of the restrictions of a video memory surface, no matter where it actually resides. This keeps applications using the display device interface from inadvertently introducing dependencies on where the surface resides into the application. In the context of the display device interface shown in FIG. 2, a "surface" is an image or an array of alpha or Z values corresponding to pixels in an image. More specifically, a surface can be an array of pixel values (pixmap or bitmap), an array of Z values or an array of alpha values. The surface memory is an area in memory (either system or video memory) that holds the this image data. The surface structure is a data structure that defines such things as the size, height, width of the surface as well as what type of surface the underlying surface memory holds. The surface memory can hold a pixmap, for example, either for display on the screen of the monitor or as an off screen work area.

A surface can also represent an alpha buffer or Z buffer. Alpha and Z buffers are just different types of surfaces. An alpha buffer is a surface that comprises an array of alpha values. Each alpha value describes the degree to which a corresponding pixel is transparent. A Z buffer is a surface that comprises bit depth information used to determine whether corresponding pixels are visible or are obscured.

In one implementation of the display interface shown in FIG. 2, a surface structure can represent a variety of different types of images as well as images in different formats. One typical form of a surface is a pixmap that covers the entire display screen of the monitor. This pixmap is sometimes referred to as the display image or display screen. In addition to representing a display image, a surface can be an overlay or a sprite. An overlay and a sprite are synonymous in the context of the display device interface 50; they refer to an image layer that is composited with another image layer. An overlay typically covers less than the entire display screen, but can be the same size as the display screen in some cases. When overlays are composited with other pixmaps, they typically have a depth value or Z order associated with them so that the display device interface or underlying hardware can determine how to composite them. The pixels in an overlay may also have associated alpha values that define their transparency. This transparency information is used along with the depth data or Z order to composite the pixel values in a source and destination image layer.

A surface can also be a texture map. A texture map is a two dimensional image that is mapped to the surface of a 3D graphical model. To summarize briefly, the process of texture mapping involves taking one or more samples from the texture map and computing the contribution of these samples on a pixel in a target image. The sampling process can be as simple as taking the nearest sample to a point mapped from the target back into the texture map. Alternatively, the sampling process can involve interpolating between samples in the texture map or filtering samples over a region in the texture map. A surface can store a texture map in different formats including a MIP (multum in parvo) map format. In a MIP mapped texture, several versions of an image are stored at different levels of detail.

A primary surface represents the pixmap image that the user is currently viewing on the display screen. More specifically, the primary surface is the surface that the display hardware is currently reading, converting to analog values, and displaying on the monitor. In these circumstances, the display device is the client of the surface. Since devices or software other than the display device can act as the client, the designation of a surface as a primary surface specifies that it is to be used by the display device as opposed to other components in the system such as a 3d rendering system or other graphics processing device. The designation as a "primary" surface also differentiates the surface from an "off-screen" surface, which is not displayed directly but can be used to construct a display image.

In many cases, an image may be constructed from arrays of related pixel data stored at different memory locations. For instance, an alpha buffer at one memory region may store an array of alpha values corresponding to an array of pixel values stored at another memory region. As another example, a Z buffer at one memory region may correspond to an array of pixel values stored at another memory region. One embodiment of the display device interface manages the relationship between associated surfaces by creating a complex surface structure. The complex structure includes two or more surfaces inter-related by an attachment link. The surfaces can be pixmaps, one or more pixmaps and an alpha buffer, one or more pixmaps and a Z buffer, as well as a variety of other combinations of surfaces.

For example, the display device interface can maintain a pixmap with an associated alpha buffer by creating a complex surface structure including two surfaces: a surface holding a pixmap, and an attached surface holding the alpha buffer. The pixmap and alpha buffer reference each other via an attachment link. As another example, the display device can maintain a pixmap with an associated Z buffer. In this case, the complex structure manages two regions of surface memory, one holding the pixmap, and another holding the Z buffer. Like the example above, the two surfaces reference each other via an attachment link. In one implementation of the interface, one of the surfaces in a complex surface structure serves as the root surface. Other surfaces are attached to the root surface to form the complex surface. The complex structure can then only be destroyed by destroying the root surface.

One embodiment of the display device interface uses a complex surface to support double and multiple buffering. Front and back buffers are types of surfaces that are used to support double buffering or buffering among more than two regions in memory. The display device interface supports double buffering as well as buffering among more than two surfaces by creating a complex surface structure comprising a front buffer and one or more back buffers. The front buffer typically holds a completed pixmap that is ready for use by some client of the interface. A back buffer can hold a completed pixmap that is queued for use by a client, or a pixmap that is under construction. The surface singled out as "the" back buffer is the one that will be visible next. Other back buffers are just labeled "flip".

Surface structures that support double or multiple buffering are designated as flipping structures. This means that the front buffer can be swapped or "flipped" with a back buffer. To create a flipping structure in one implementation of the display interface, an application invokes a function in the interface responsible for creating a surface structure and designates it as a flipping structure.

Figure 4A:
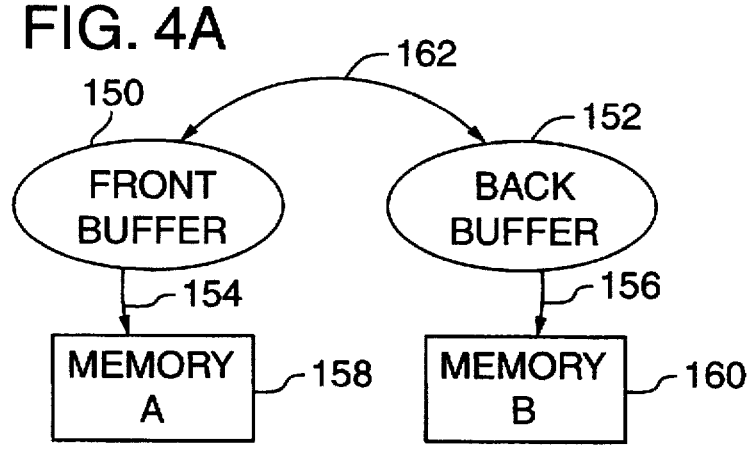
FIGS. 4A and 4B are diagrams illustrating an example of a flipping structure with a front and back buffer.
Figure 4B:
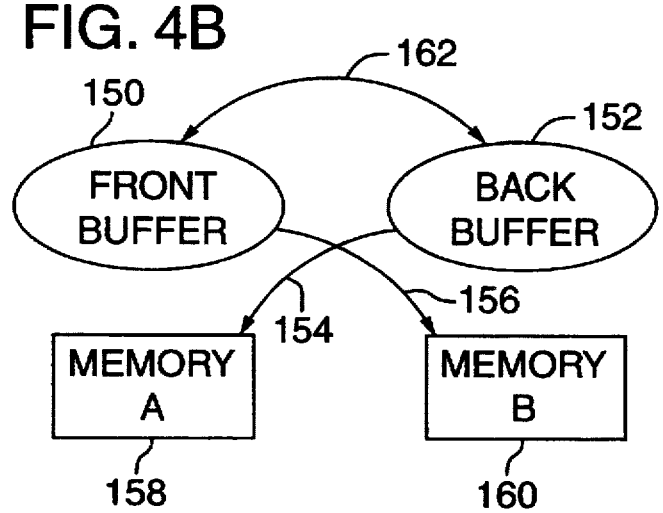

To support double buffering, for example, the application requests the interface to create a surface structure comprised of at least two surfaces, including a front and back buffer. FIGS. 4A and 4B are diagrams illustrating an example of a flipping structure with a front and back buffer. As shown in FIG. 4A, both the front and back buffer structures 150, 152 refer to corresponding regions of memory: a reference pointer 154 in the front buffer structure refers to region A 158, while a reference pointer 156 in the back buffer structure refers to region B 160. The front and back buffer structures are linked to each other with an attachment link 162.

The display interface includes a flip function that operates on the flipping structure. In response to a single call to this flip function, the surface structures including the front and back buffer structures 150 and 152, remain constant from the perspective of the application. If the application wishes to draw into a surface, it performs its operations on the surface that it is concerned with and does not have to track the specific address of the underlying surface memory (158, 160) that holds the surface before and after a flip operation. The flip function controls the details of the flip operation by determining when the underlying surface memory can be swapped and by keeping track of the specific location of the underlying surface memory.

To perform a flip on a structure with one front and one back buffer, the interface swaps or "flips" the reference pointers 150, 152. After the flip, the front buffer is reference pointer 156 refers to region B 160 and the back buffer reference pointer 154 refers to region A 158.

Figure 5A:
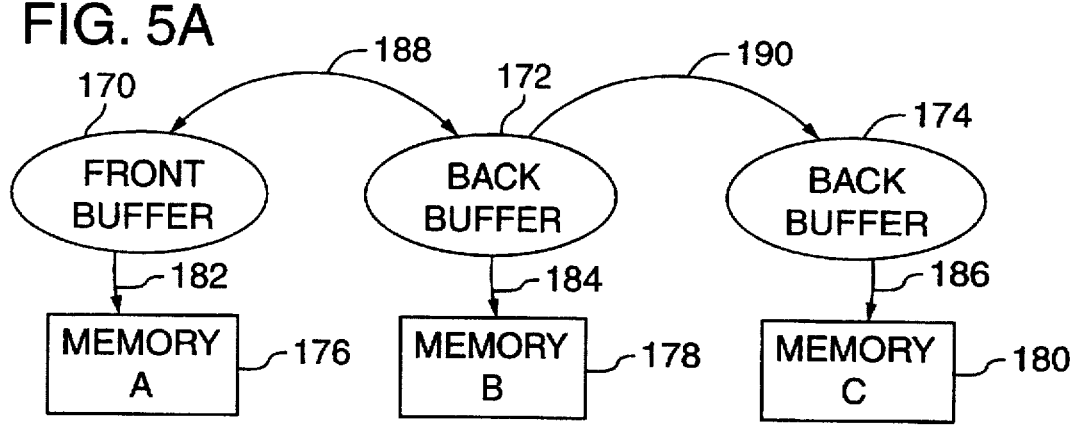
FIGS. 5A, 5B, and 5C are diagrams illustrating an example of a surface structure with a front buffer and two back buffers.
Figure 5B:
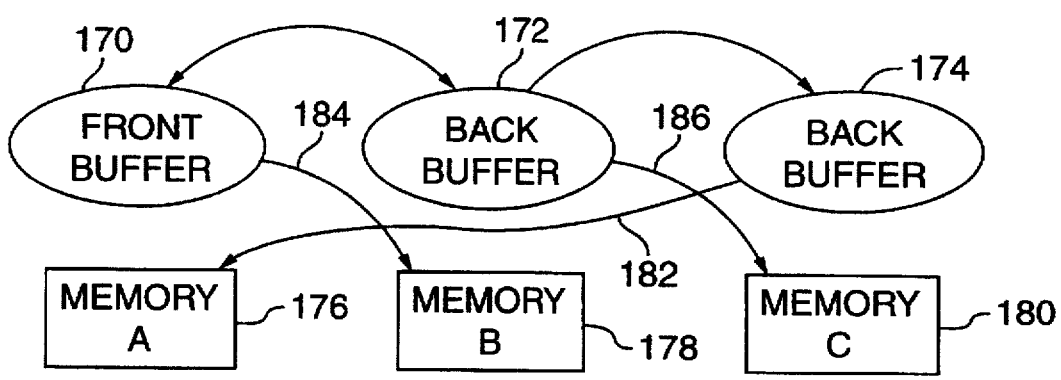
Figure 5C:
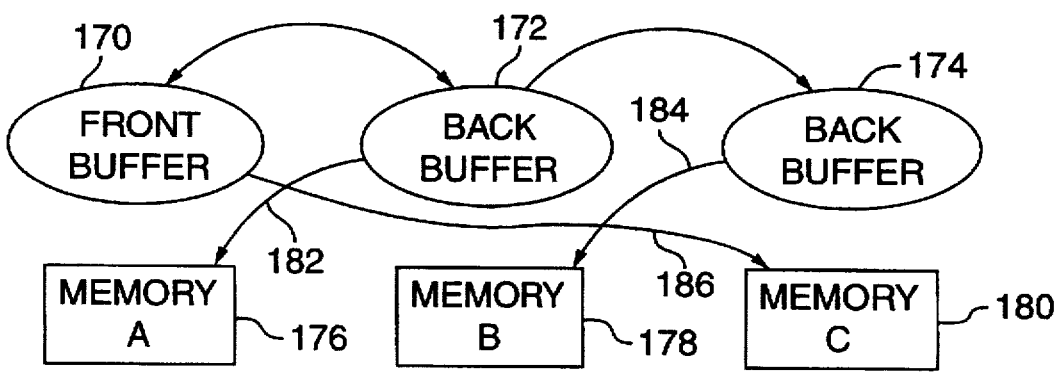

To support buffering among more than two surfaces, the interface creates a flipping surface structure that has a front buffer and two or more back buffers. FIGS. 5A, 5B and 5C are diagrams illustrating an example of a surface structure with a front buffer 170 and two back buffers 172, 174. Each of the buffers refer to pixel surface memory 176, 178, 180 through corresponding reference pointers 182, 184, 186. In addition, the buffers are linked to each other by attachment links 188, 190. To perform a flip in this example, the interface rotates the surfaces in a circular pattern. Other patterns of exchanging the underlying memory are possible as well, including a pattern specifically requested by an application.

FIGS. 5A–5C illustrate an example of how the flipping operation in the interface rotates the surfaces. In FIG. 5A, the front buffer refers to memory region A 176, while the first and second back buffers refer to memory regions B and C (178, 180), respectively. After the first flip, the front buffer refers to memory B 178, while the first and second back buffers refer to memory regions C and A (180, 176), respectively, as shown in FIG. 5B. At this point, the reference pointer 184 in the front buffer structure refers to region B, the reference pointer in the first back buffer structure refers to region C, and the reference pointer in the second buffer structure refers to region A.

After another flip, the front buffer refers to memory C, while the first and second back buffers refer to memory regions A and B, respectively, as shown in FIG. 5C. The flip function moves the reference pointers to the next surface structure as shown.

In this example, each flip operation rotates the image in the front buffer to the last back buffer in the structure, and each image in a back buffer moves one step closer to the front buffer. This example illustrates one method for exchanging pixel memory among front and back buffers. Other methods are possible as well. In addition, the application may specify to the interface which back buffer is to be flipped with the front buffer. Though we describe the flipping operation with specific examples, the specific methods of how the interface controls access to surface memory, how it keeps track of the location of the surface memory, and how it controls the timing of the flip can vary. We describe one possible implementation of the flip function and the surface structures that support double and multiple buffering in further detail below.

Figure 6A:
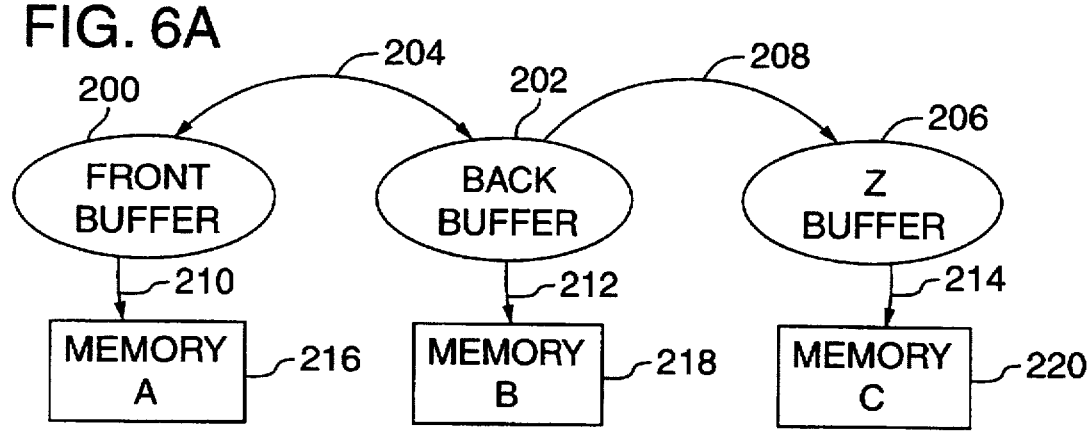
FIGS. 6A and 6B are diagrams of a complex flipping structure with an attached Z buffer.
Figure 6B:
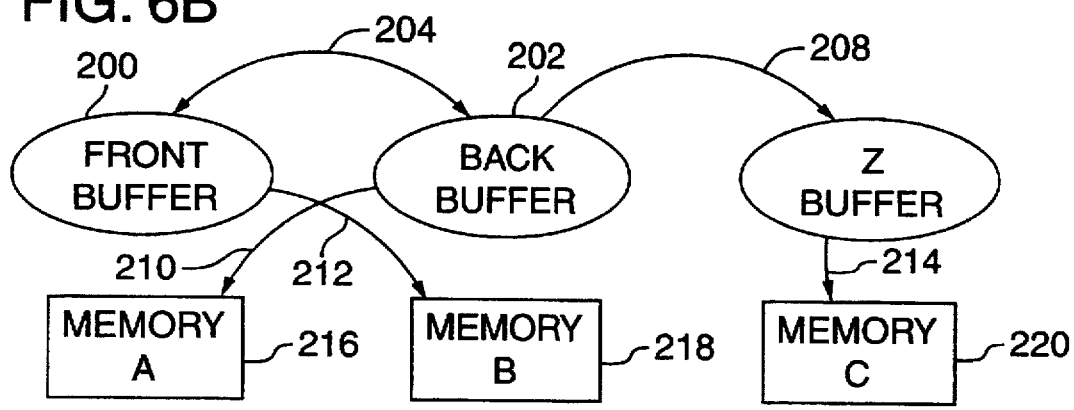

The display device interface also supports double and multiple buffering for complex structures which include a Z buffer, an alpha buffer or both. FIGS. 6A and 6B are diagrams of a complex flipping structure with an attached Z buffer. The complex structure includes front and back buffers 200, 202 attached to each other by an attachment link 204. The back buffer 202 is attached to a Z buffer 206 by a separate attachment link 208. Each of the buffer structures include reference pointers 210–214 to the underlying surface memory. Before a flip operation, the front and back buffers refer to memory regions A and B (216, 218), respectively, and the Z buffer refers to memory region C (220). In this particular example, an application can use the Z buffer 206 to construct a pixmap in the back buffer. When the image is complete, it can then request a flip and begin constructing a new image in the surface memory associated with the back buffer structure 202.

Attachment links are distinguished by surface capabilities. The display device interface provides enumeration of these links so surfaces can be passed around and queried for their attachments. Connecting surfaces together augments their behavior, these synergies disappear when the attachments are deleted. The following pseudo code describes an algorithm for adding and deleting attachments:

Add Attachment

Linking surface to itself?
   Yes, Fail.
Is either surface lost?
   Yes, Fail.

-continued

Are the surfaces already attached?
   Yes, Fail
Do surface dimensions match?
   No, Fail
Is this type of surface (alpha, z-buffer) already attached to the surface?
   Yes, Fail
Is the requested surface part of a flippable chain and would the new attachment create another flippable chain?
   Yes, Fail
Is one surface emulated and the other not?
   Yes, Fail.
Does HAL say it is OK to attach these surfaces?
   No, Fail.
Can the two surfaces be flipped together, or is the surface to be attach already flippable?
   Yes: attach the two surfaces, new structure is not flippable
   No: Is the surface we are trying to attach to already flippable?
      No: attach the two surfaces
         mark surfaces as flippable
         set up front & back buffer attributes
      Yes: attach new surface as part of flippable chain:
         Are we attaching to the front buffer:
            Yes: new surface is back buffer, old back buffer is now
               offscreen plain.
            No: new surface is offscreen plain Delete Attachment Is either surface lost?
   Yes, Fail.
Are surfaces attached?
   No: Fail
Is this an implicit attachment?
   Yes: Fail
Is surface to be detached part of a flippable chain?
   No: delete attachment links and exit
Is there a front buffer in the chain?
   No: delete attachment links and exit
Are just two surfaces left attached?
   Yes: remaining surface is no longer flippable
      restore surfaces' original attributes
      delete attachment links and exit
Link surface before surface the surface being detached to the surface after the one being detached
Is surface to be detached the front buffer?
   Yes: make surface after the one being removed the front buffer
      make the surface after the new front buffer the back buffer
Is surface being detached the back buffer?
   Yes: make the surface after the one being removed the back buffer.
Restore attributes of the surface being unattached surface
Delete attachment links and exit After the flip, the back buffer 202 refers to memory region A 216, and the front buffer refers to memory region B 218. The flip function, in this example, swaps the reference pointers 210, 212 between the front and back buffers. The Z buffer continues to refer to memory region C, and thus is not affected by the flip operation. The Z buffer is always related to the back buffer structure in this case, not the specific memory.

Figure 7A:
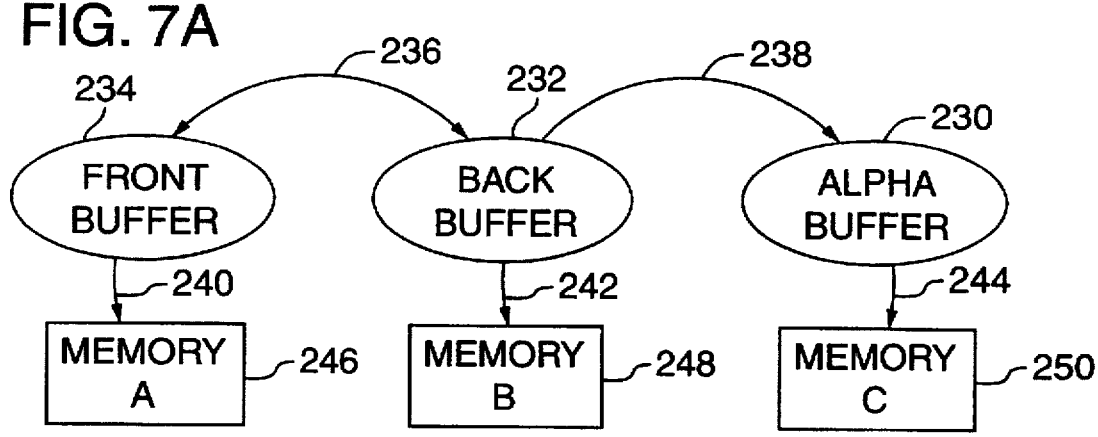
FIG. 7A and 7B are diagrams of a complex flipping structure with an attached alpha buffer.
Figure 7B:
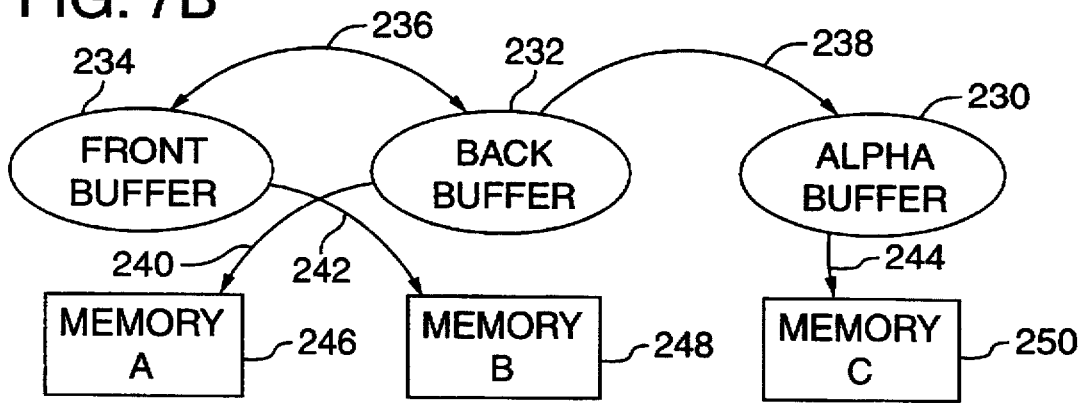

While the example in FIGS. 6A and 6B specifically depicts a Z buffer, a variety of other configurations are also possible. For instance, an alpha buffer 230 could be attached to the back buffer 232 in place of the Z buffer as shown in FIGS. 7A and 7B. Both an alpha buffer and a Z buffer could be attached to the back buffer as well.

The complex surface structure in FIGS. 7A and 7B includes a front buffer 234, a back buffer 232, and an alpha buffer 230. The front and back buffer are attached via an attachment link 236. Similarly, the alpha buffer is attached to the back buffer via an attachment link 238. The buffer structures include reference pointers 240–244 to surface memory 246–250. The reference pointer 240 in the front buffer structure points to region A, the reference pointer 242 in the back buffer structure points to region B 248, and finally, the reference pointer 244 in the alpha buffer structure points to region C 250.

After a flip, the front buffer refers to region B and the back buffer refers to region A. The flip function exchanges the reference pointers 240, 242 in the front and back buffer structures 234, 232. The reference pointer 244 in the alpha buffer structure continues to point to memory region C 250.

In one embodiment, the display device interface shown in FIG. 2 is implemented as an object that represents the underlying display device hardware. There can be one instance of a display device object for every logical display device in operation. For example, a software development environment may have two monitors, one running a game using the display device interface shown in FIG. 2, and another running the development environment using an alternative display device interface such as GDI (the graphics device interface), which is part of the Windows® 95 operating system from Microsoft Corporation.

The display device object in this particular architecture owns all of the global attributes of the display device (e.g. video card) that it represents. It controls default values for the global attributes such as the number of overlays, color depth, resolution and the hardware's display mode. As explained further below, it also can control a default color table or palette for the primary surface.

In this implementation of the display device interface, the display device object includes a number of member functions to create additional objects, which provide services through their respective member functions. These objects include a surface object, a palette object, and a clipper object.

A surface object is a specific way to implement the surface structures described above. A surface object, therefore, represents a region in memory that holds a pixmap, an alpha buffer, or a Z buffer, for example. The member functions of the surface object provides services for managing and manipulating surfaces. As explained in further detail below, these services include functions to flip surfaces, attach or detach a surface, perform a bit block transfer, list surfaces attached to a given surface, return capabilities of the surface, return the clipper object attached to the surface, etc.

A palette object is an object that represents a color table. Through a palette object, an application can gain access to and manipulate the color table of the display device. A palette object allows direct manipulation of the palette table as a table. This table can have 16 or 24 bit RGB entries representing the colors associated with each of the indexes or, for 16 color palettes, it can also contain indexes to another 256 color palette. Entries in these tables can be retrieved with a get entries member function and changed with set entries member function.

In this implementation, a palette object becomes associated with a surface object when attached to it. Palette objects can be attached to the pixmap surfaces described above such as the primary surface, an off screen surface, a texture map, and an overlay. Each of the palette objects attached to these surfaces can be different.

One embodiment of the display device interface simplifies color specification for surfaces by supporting default palettes. If a surface object does not have an attached palette, it automatically defaults to the palette of the primary surface. In this architecture, the display device object controls the default palette.

The clipper objects represent clip lists. A clipper object can be attached to any surface. In one implementation of the display device interface for a windowing environment, a window handle can be attached to a clipper object. Using the information provided by the window handle, the display device interface can update the clip list of the clipper object with the clip list of the window as the clip list for the window changes.

In order to create a surface, palette or clipper object, the application first creates an instance of a display device object. The application can then create one of these objects by invoking one of the display device object's member functions to create the object.

FIG. 8 is a block diagram illustrating the object architecture in one embodiment. The display device object 300 for a display device is the creator and owner of the surface objects 302–308 and palette objects 310–312 for that display device. It is responsible for managing all of the objects that it creates. This ownership relationship is represented by the solid arrows 314, 316, 318 from the display device object 300 to its surface objects 302–308 and palette objects 310–312. The palette objects 310–312 are attached to associated surface objects via attachment links 320, 322.

To create a surface object in this architecture, the application calls the display device object's "create surface" member function. In response, the CreateSurface member function creates a surface object that represents a surface and the underlying surface memory that holds it. The member function creates a surface object with the attributes and capabilities specified by the application. If the application requests a complex surface (a surface structure including more than one surface), then the member function in this implementation creates instances of surface objects for each surface and attaches them appropriately.

The application can specify the attributes of the surface object by setting fields in a surface description structure that it passes to the create surface member function. One implementation of this structure and a description of its fields is set forth below:

```
typedef struct_DDSURFACEDESC{
    DWORD    dwSize;
    DWORD    dwFlags;
    DWORD    dwHeight;
    DWORD    dwWidth;
    LONG     lPitch;
    union
    {
        DWORD    dwBackBufferCount;
        DWORD    dwMipMapCount;
    }
    DWORD    dwZBufferBitDepth;
    DWORD    dwAlphaBitDepth;
    DWORD    dwReserved;
```

```
    LPVOID      lpSurface;
    DDCOLORKEY  ddckCKDestOverlay;
    DDCOLORKEY  ddckCKDestBlt;
    DDCOLORKEY  ddckCKSrcOverlay;
    DDCOLORKEY  ddckCKSrcBlt;
    DDPIXELFORMAT  ddpfPixelFormat;
    DDSCAPS     ddsCaps;
} DDSURFACEDESC, FAR*LPDDSURFACEDESC;
```
dwSize
    Size of the structure. Initialized prior to use.
dwFlags
    DDSD_CAPS    ddsCaps field is valid.
    DDSD_HEIGHT    dwHeight field is valid.
    DDSD_WIDTH    dwWidth field is valid.
    DDSD_PITCH    lPitch is valid.
    DDSD_BACKBUFFERCOUNT  dwBackBufferCount is valid.
    DDSD_ZBUFFERBITDEPTH  dwZBufferBitDepth is valid.
    DDSD_ALPHABITDEPTH    dwAlphaBitDepth is valid.
    DDSD_LPSURFACE    lpSurface is valid.
    DDSD_PIXELFORMAT    ddpfPixelFormat is valid.
    DDSD_CKDESTOVERLAY    ddckCKDestOverlay is valid.
DDSD_CKDESTBLT    ddckCKDestBlt is valid.
DDSD_CKSRCOVERLAY    ddckCKSrcOverlay is valid.
DDSD_CKSRCBLT    ddckCKSrcBlt is valid.
DDSD_ALL    All input fields are valid.
dwHeight
    Height of surface.
dwWidth;
    Width of input surface.
lPitch
    Distance to start of next line (return value only).
dwBackBufferCount
    Number of back buffers.
dwMipMapCount
    Number of mip-map levels.
dwZBufferBitDepth
    Depth of Z buffer.
dwAlphaBitDepth
    Depth of alpha buffer.
dwReserved
    Reserved.
lpSurface
    Pointer to the associated surface memory.
ddckCKDestOverlay
    Color key for destination overlay use.
ddckCKDestBlt
    Color key for destination blit use.
ddckCKSrcOverlay
    Color key for source overlay use.
ddckCKSrcBlt
    Color key for source blit use.
ddpfPixelFormat
    Pixel format description of the surface.
ddsCaps
    Surface capabilities.

The surface object maintains a list of its capabilities in a surface capabilities structure. As shown in the implementation above, this structure is part of the surface description structure. One implementation of the surface capabilities and a description of its fields follows below:

```
typedef struct_DDSCAPS{
    DWORD  dwCaps;
} DDSCAPS, FAR*LPDDSCAPS;
dwCaps
```

DDSCAPS_3D
    Indicates that this surface is a front buffer, back buffer, or texture map that is being used in conjunction with a 3D rendering system.

DDSCAPS_ALPHA
    Indicates that this surface contains alpha information. The pixel format must be interrogated to determine whether this surface contains only alpha information or alpha information interlaced with pixel color data (e.g. RGBA or YUVA).

DDSCAPS_BACKBUFFER
    Indicates that this surface is a backbuffer. It is generally set by the create surface function when the DDSCAPS_FLIP capability bit is set. It indicates that this surface is THE back buffer of a surface flipping structure. DirectDraw supports N surfaces in a surface flipping structure. Only the surface that immediately precedes the DDSCAPS_FRONTBUFFER has this capability bit set. The other surfaces are identified as back buffers by the presence of the DDSCAPS_FLIP capability, their attachment order, and the absence of the DDSCAPS_FRONTBUFFER and DDSCAPS_BACKBUFFER capabilities. The bit is sent to the create surface function when a stand-alone back buffer is being created. This surface could be attached to a front buffer and/or back buffers to form a flipping surface structure after the call to the create surface function.

DDSCAPS_COMPLEX

Indicates a complex surface structure is being described. A complex surface structure results in the creation of more than one surface. The additional surfaces are attached to the root surface. The complex structure can only be destroyed by destroying the root.

DDSCAPS_FLIP

Indicates that this surface is a part of a surface flipping structure. When it is passed to create surface function, the DDSCAPS_FRONTBUFFER and DDSCAPS_BACKBUFFER bits are not set. They are set by the create surface function on the resulting creations. The dwBackBufferCount field in the DDSURFACEDESC structure must be set to at least 1 in order for the create surface function call to succeed. The DDSCAPS_COMPLEX capability must always be set when creating multiple surfaces through create surface function.

DDSCAPS_FRONTBUFFER

Indicates that this surface is THE front buffer of a surface flipping structure. It is generally set by create surface function when the DDSCAPS_FLIP capability bit is set. If this capability is sent to the create surface function, then a stand-alone front buffer is created. This surface will not have the DDSCAPS_FLIP capability. It can be attached to other back buffers to form a flipping structure.

DDSCAPS_HWCODEC

Indicates surface should be able to have a stream decompressed to it by the hardware. This tells the hardware to reserve bandwidth and to prepare for locks to access at interrupt time.

DDSCAPS_LIVEVIDEO

Indicates surface should be able to receive live video.

DDSCAPS_MODEX

Surface is a 320×200 or 320×240 ModeX surface.

DDSCAPS_OFFSCREENPLAIN

Indicates that this surface is any offscreen surface that is not an overlay, texture, Z buffer, front buffer, back buffer, or alpha surface.

DDSCAPS_OWNDC

Indicates surface will have a DC associated long term.

DDSCAPS_OVERLAY

Indicates that this surface is an overlay. It may or may not be directly visible depending on whether or not it is currently being overlayed onto the primary surface. DDSCAPS_VISIBLE can be used to determine whether or not it is being overlayed at the moment.

DDSCAPS_PALETTE

Indicates that unique DirectDrawPalette objects can be created and attached to this surface.

DDSCAPS_PRIMARYSURFACE

Indicates that this surface is the primary surface. The primary surface represents what the user is seeing at the moment.

DDSCAPS_PRIMARYSURFACELEFT

Indicates that this surface is the primary surface for the left eye. The primary surface for the left eye represents what the user is seeing at the moment with the user's left eye. When this surface is created the DDSCAPS_PRIMARYSURFACE represents what the user is seeing with the user's right eye.

DDSCAPS_SYSTEMMEMORY

Indicates that this surface memory was allocated in system memory.

DDSCAPS_TEXTURE

Indicates that this surface can be used as a 3D texture. It does not indicate whether or not the surface is being used for that purpose.

DDSCAPS_VIDEOMEMORY

Indicates that this surface exists in video memory.

DDSCAPS_VISIBLE

Indicates that changes made to this surface are immediately visible. It is always set for the primary surface and is set for overlays while they are being overlayed and texture maps while they are being textured.

DDSCAPS_WRITEONLY

Indicates that only writes are permitted to the surface. Read accesses from the surface may or may not generate a protection fault, but the results of a read from this surface will not be meaningful.

DDSCAPS_ZBUFFER

Indicates that this surface is the Z buffer. The Z buffer does not contain displayable information. Instead, it contains bit depth information that is used to determine which pixels are visible and which are obscured.

The create surface function can be used to create a variety of different surface structures. One example, as explained generally above, is a primary surface. When an application requests the interface to create a primary surface in this implementation, the interface creates a surface object to access the surface memory currently being used to generate the display image. This enables the application to access surface memory that is already being used by another process in the computer. For example in the context of a computer running the Windows Operating System, GDI may currently be using this surface memory to control the display. To create a primary surface in this example, the application fills in the relevant fields of the surface description structure passed to the interface on the create surface function call.

The application would fill in the fields of the surface description structure as follows:

DDSURFACEDESC ddsd; ddsd.dwSize=sizeof( ddsd );

//Tell DDRAW which fields are valid ddsd.dwFlags= DDSD_CAPS;

//Ask for a primary surface ddsd.ddsCaps.dwCaps= DDSCAPS_PRIMARY SURFACE;

Since the surface memory is already being used in the system, there is no need to specify the height and width of the primary surface.

As another example, an application can create a plain, off screen surface. An off screen surface can be used to store pixmaps that will be combined with other surfaces in the video card, for example. In requesting the interface to create this surface, the application might fill in the surface description structure as follows:

DDSURFACEDESC ddsd; ddsd.dwSize=sizeof( ddsd);

//Tell DDRAW which fields are valid ddsd.dwFlags= DDSD_CAPS|DDSD_HEIGHT|DDSD_WIDTH;

//Ask for a simple offscreen surface, sized 100 by 100 pixels ddsd.ddsCaps.dwCaps=DDSCAPS_ OFFSCREENPLAIN;

dwHeight=100; dwWidth=100;

In this implementation, the interface attempts to create this off screen surface in video memory, and if there is not enough memory, it uses system memory. Also, because no pixel format was specified, the offscreen surface is in the pixel format of the primary surface.

The create surface function can be used to create a complex surface structure in a single function call. If the DDSCAPS_COMPLEX flag is set in the create surface call, one or more "implicit" surfaces will be created by the interface in addition to the surface explicitly specified. For example, a single call to release a complex surface will release all surfaces in the structure, and a single call to restore a surface will restore them all.

One example of a complex surface structure in this implementation is a surface structure that includes a Primary Surface and one or more back buffers that form a surface flipping environment. The fields in the DDSURFACEDESC structure, ddsd below, relevant to complex surface creation are filled in to describe a flipping surface that has one back buffer.

DDSURFACEDESC ddsd; ddsd.dwSize=sizeof(ddsd);
//Tell DDRAW which fields are valid ddsd.dwFlags= DDSD_CAPS|DDSD_BACKBUFFERCOUNT;
//Ask for a primary surface with a single back buffer ddsd.ddsCaps.dwCaps=DDSCAPS_ COMPLEX|DDSCAPS_FLIP|DDSCAPS_ PRIMARYSURFACE; ddsd.dwBackBufferCount=1;

The statements in the example above construct a double-buffered flipping environment. A single call to a flip function in the display device interface exchanges the surface memory of the primary surface and the back buffer. If a BackBufferCount of "2" had been specified, two back buffers would have been created, and each call to the flip function would have rotated the surfaces in a circular pattern, providing a triple buffered flipping environment.

The surface object includes a number of member functions that enable applications to modify or get information about attached surfaces. The term, "attached surface," refers to a surface in a complex surface structure that is attached to one or more other surfaces.

To attach a surface to another, an application invokes an attach surface member function of the surface object. Examples of possible attachments include Z buffers, alpha channels, and backbuffers. Different types of surfaces can be attached to each other; for example, a flippable Z buffer can be attached to a regular flippable surface.

If a non-flippable surface is attached to another non-flippable surface of the same type, the two surfaces will become a flippable chain. If a non-flippable surface is attached to a flippable surface, it becomes part of the existing flippable chain. Additional surfaces can be added to this chain, and each call of the flip member function will cycle one step through the surfaces.

The surface object also includes a member function to detach a surface.

If NULL is passed as the surface to be detached in this implementation, all attached surfaces will be detached. Implicit attachments (those formed by the interface, rather than in response to a call to the attach surface function) cannot be detached. Detaching surfaces from a flippable chain can change other surfaces in the chain. If a FRONT-BUFFER is detached from a flippable chain, the next surface in the chain becomes the FRONTBUFFER and the surface following it becomes the BACKBUFFER. If a BACK-BUFFER is detached from a chain, the following surface becomes a BACKBUFFER. If a plain surface is detached from a chain, the chain simply becomes shorter. If a flippable chain only has two surfaces and they are detached, the flippable chain is destroyed and both surfaces return to their previous designations.

The surface objects include a member function to retrieve an attached surface with specified capabilities. To invoke this function, it is called and passed the surface capabilities structure with the desired capabilities set.

If more than one attached surface has the desired capabilities, an application can call a member function to enumerate the attached surfaces.

Another member function of the surface object relating to attached surfaces is a function that is used to enumerate attached surfaces. When invoked by an application, this function enumerates each surface attached to a specified surface. The function invokes a call back function for each attached surface.

To support double and multiple buffering using surface objects, surface objects include a flip member function. This function call makes the surface memory associated with a back buffer surface become associated with the front buffer surface. The surface memory previously associated with the front buffer is associated with the back buffer. If there is more than one back buffer, then a ring is formed and the surface memory buffers cycle one step through this ring every time the flip function is invoked.

While the flip function adjusts the underlying surface memory in response to a flip, the surface objects in the flipping structure stay constant. For example, in the context of double buffering, an application that draws on the back buffer always uses the same surface object. The flip function switches only the surface memory underneath the surface object when a flip operation is requested.

An application or other program requesting a flip can override the default behavior of the flip function by specifying the surface structure that will act as the target of a flip. In this case, the flip function swaps the surface memory underneath the front buffer with the surface memory underneath the specified surface object.

The flip function controls when the exchange of the underlying surface memory occurs and ensures that an application does not draw to surface memory that is currently being used by a client such as a display device. In this implementation, the flip function is synchronized with the vertical blank signal. The flip function sets a register in the display hardware so that the exchange of the surface memory occurs when the display hardware performs a vertical retrace. The flip operation is asynchronous so that the application can continue processing after it calls the flip function. In the interim after the flip call and before the vertical retrace, the interface write blocks the surface memory that previously was associated with the front buffer. Access is limited only to the buffer being flipped away from; the primary surface or front buffer is always accessible.

If the surface memory previously associated with the front buffer is still being displayed after an application invokes the flip function, the interface does not allow the application to draw to the new back buffer. This is necessary because the new back buffer, in these circumstances, refers to the surface memory that is still being used by the display hardware. When the interface receives the vertical blank signal, this condition is resolved, and the application can now draw to the back buffer.

In the case where an application attempts to draw to a surface memory that is not available in these circumstances, the flip function, status function or lock function returns a value indicating that the display device was still drawing to the display monitor.

When an application attempts to invoke the flip function on a surface, and the display hardware is in a state that makes it unable for the interface to complete the flip, the flip function will return an error. In this implementation, the application can avoid this response by instructing the flip function to keep trying until it is successful or some other error occurs. To accomplish this, the application calls the flip function and sets an additional flag instructing the flip function to wait and retry if the hardware is temporarily not available.

One way to implement the display device, surface, palette, and clipper objects described above is to implement them as a COM interface. The objects in the display device architecture described above are implemented as COM interfaces. The member functions of the object types include the standard member function of a COM interface in addition to the specific functions described above. The design and function of a COM interface is well understood in the field and is described in several publicly available documents including *Inside OLE* by Craig Brockschmidt.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

We claim:

1. In a display device interface implemented in a computer that includes a system memory, a video memory and a display controller, a method for managing surface memory in either the system or video memory, the method comprising:

in response to receiving a create surface function call in the display device interface, allocating first and second regions in video or system memory, creating a surface structure that includes front and back buffer structures, storing a front buffer reference to the first region and a back buffer reference to the second region in the front and back buffer structures, respectively;

prior to a flip function where the display interface changes the front and back buffer references, controlling accesses to the second region in response to a first call from an application to modify the back buffer, wherein the first call specifies the back buffer structure but does not specify a memory address in the second region;

in response to a call to the flip function, changing the front buffer reference to refer to the second region, and changing the back buffer reference to refer to a third region in the video memory; and after the call to the flip function, manipulating the third region in response to a second call from the application to modify the back buffer, wherein the second call specifies the back buffer structure but does not specify a memory address in the third region.

2. The method of claim 1 wherein the step of allocating the first and second memory regions includes checking to determine whether a sufficient amount of the video memory is available, and when the video memory is insufficient to create the surface, allocating the first and second regions in system memory.

3. The method of claim 1 wherein the first and third region are the same region.

4. The method of claim 1 wherein the front buffer represents a primary surface, which the display controller converts into a display image for display on a display monitor.

5. The method of claim 1 wherein the front buffer represents an off screen surface.

6. The method of claim 1 wherein the display device interface is operable to enable applications to access a primary surface in video memory, where the primary surface comprises a pixmap that the display controller converts into a display image on a display monitor and the primary surface has a width, W, and wherein the method further includes:

in response to a request from an application to allocate a secondary surface in video memory, determining width of the secondary surface and rejecting the request to allocate the secondary surface if the width of the secondary surface is greater than W.

7. The method of claim 1 wherein the surface structure further includes a second back buffer that refers to a fourth region in video memory, wherein the step of creating the surface structure includes maintaining a second back buffer reference to the fourth region, and wherein the method further includes:

in response to the call to the flip function, rotating the front buffer reference, the back buffer reference, and the second back buffer reference so that the front buffer reference refers to the second region, the back buffer reference refers to the fourth region, and the second back buffer reference refers to the first region.

8. The method of claim 1 wherein the surface structure further includes Z buffer that refers to a fourth region in video memory that holds an array of Z values, wherein the step of creating the surface structure includes maintaining a reference to the fourth region and further includes attaching the Z buffer to the back buffer.

9. The method of claim 1 wherein the surface structure further includes an alpha buffer that refers to a fourth region in video memory that holds an array of alpha values, wherein the step of creating the surface structure includes maintaining a reference to the fourth region and further includes attaching the alpha buffer to the back buffer.

10. The method of claim 1 further including:

in response to receiving a call to create an off screen surface, creating a plain surface structure that includes reference to a fourth region in video memory;

caching an off screen pixmap in the fourth region in memory in response to a call from the application that specifies the plain surface structure, but does not specify an address of the fourth region in video memory.

11. The method of claim 1 wherein the step of creating the surface structure includes creating a surface structure with more than two back buffers, and maintaining a corresponding buffer reference for each of the back buffers, and the step of changing the buffer references includes rotating the front buffer reference and the corresponding back buffer references.

12. In a programmed computer system including a display device, a processor executing one or more application programs, a system memory and a display device controller including video memory, a display device interface comprising:

an interface function residing in system memory, the interface function operable to create an instance of a display object, the display object including a create surface member function to create an instance of a surface object;

a first instance of the surface object located in system memory and representing a front buffer located at a first location in video memory, the first instance of the surface object operable to maintain a front buffer reference to the first location;

a second instance of the surface object attached to the first instance of the surface object, the second instance located in system memory and representing a back buffer located at a second location in video memory, the second instance of the surface object operable to maintain a back buffer reference to the second location;

a flip function communicative with the first and second instances of the surface object, the flip function operable to receive a flip function call from an application, and in response, operable to change the front and back buffer references so that the front buffer reference points to a new surface to be displayed and the back buffer reference points to scratch memory, wherein the attachment between the first and second instances of the surface object is the same before and after the flip function call.

13. The display device interface of claim 12 wherein the front buffer stores a surface currently being displayed by the display device.

14. The display device interface of claim 12 further including a third instance of the surface object attached to the second instance of the surface object, the third instance located in system memory and representing a second back buffer located at a third location in video memory, the third instance of the surface object operable to maintain a back buffer reference to the third location;

wherein the flip function is communicative with the third instances of the surface object, the flip function operable to receive a flip function call from an application, and in response, operable to change the front buffer reference, the back buffer reference, and the second back buffer reference so that the front buffer reference points to second location, the back buffer points to the third location, and second back buffer points to the first location.

15. The display device interface of claim 12 further including a third instance of the surface object attached to the second instance of the surface object, the third instance located in system memory and representing a Z buffer located at a third location in video memory, the third instance of the surface object operable to maintain a buffer reference to the third location.

16. In a display device interface implemented in a computer system that includes a processor and system memory and a display device that includes video memory, a method for managing surface memory in either the system or surface memory, the method comprising:

in response to a call to create a display object interface representing the display device, creating a display object representing the display device;

in response to a call to create a surface structure including a front buffer and a back buffer, creating a first surface object representing the front buffer, creating a second surface object representing the back buffer, and attaching the second surface object to the first surface object;

within the first and second surface objects, maintaining a pointer to a corresponding location in video memory where the front buffer and back buffer are currently located; and in response to a call to flip the surface structure, maintaining the attachment relationship between the first and second surface objects, but changing the pointers to the corresponding locations in video memory so that the pointer for the front buffer points to a location in video memory that previously stored the back buffer and the pointer for the back buffer points to another location in video memory.

17. In a display device interface implemented in a computer that includes a system memory and a video memory, a method for managing surface memory in either the system or surface memory, the method comprising:

in response to receiving a create surface function call in the display device interface, allocating front and back buffers in video memory, creating front and back buffer structures that represent the front and back buffers, storing an address of the front buffer in the front buffer structure, and storing an address of the back buffer in the back buffer structure;

prior to a flip function where the display interface changes the addresses stored in the front and back buffer structures, controlling access to the back buffer in response to API calls from one or more applications to modify the back buffer, wherein the API calls specify the back buffer structure but do not specify a memory address in the back buffer;

in response to a call to the flip function, changing the address stored in the front buffer structure to an address of a former back buffer, changing the address stored in the back buffer structure to a new back buffer; and after the call to the flip function, controlling access to the new back buffer in response to API calls from the one or more application programs to modify the back buffer, wherein the specify the back buffer structure but do not specify a memory address in the new back buffer.

* * * * *

UNITED STATES PATENT AND TRADEMARK OFFICE
CERTIFICATE OF CORRECTION

PATENT NO. : 5,801,717

DATED : September 1, 1998

INVENTOR(S) : G. Eric Engstrom

It is certified that error appears in the above-indentified patent and that said Letters Patent is hereby corrected as shown below:

```
     Column 2, line 5, "control a" should read --control--.

Column 12, line 49, "the this" should read --the--.

Column 13, line 38, "3d" should read --3D--.

Column 14, line 54, "buffer is reference" should read
--buffer reference--.

Column 16, line 13, "to be attach" should read --to be
attached--.

Column 23, line 2, "surface" should read --surface.--.

Column 28, line 44, "the" should read --the API calls-
-.
```

Signed and Sealed this

Twelfth Day of October, 1999

Attest:

Q. TODD DICKINSON

*Attesting Officer*    *Acting Commissioner of Patents and Trademarks*